United States Patent

[11] 3,624,825

| [72] | Inventor | Charles J. Heitzman<br>1260 Laukahi, Honolulu, Hawaii 96821 |
|---|---|---|
| [21] | Appl. No. | 799,564 |
| [22] | Filed | Feb. 17, 1969 |
| [45] | Patented | Nov. 30, 1971 |

[54] CONCRETE MOLDING MACHINE
9 Claims, 10 Drawing Figs.

[52] U.S. Cl. .................................................. 25/41 R,
25/120, 25/122, 249/74
[51] Int. Cl. ...................................................... B28b 7/10
[50] Field of Search ........................................... 25/41.1,
120, 122; 249/74

[56] References Cited
UNITED STATES PATENTS

| 2,663,063 | 12/1953 | VanLoon | 25/120 UX |
| 2,937,421 | 5/1960 | Taccone | 164/207 X |
| 3,103,729 | 9/1963 | Flamand | 25/120 X |
| 3,303,545 | 2/1967 | Heitzman | 25/122 X |

*Primary Examiner*—J. Spencer Overholser
*Assistant Examiner*—John E. Roethel
*Attorney*—Wilmer Mechlin

ABSTRACT: A machine for molding articles of concrete and other self-hardening material in which a mold box containing a mold open at one end, a stripping ram and a push plate driven by the ram for pushing a finished article and its pallet from the mold's open end, are all mounted on a pivoted bed for swinging therewith between a vertical loading position and a horizontal stripping position, the parts other than the ram and bed being selectively changeable and the connection between the ram and push plate adjustable for molding articles of different shapes and lengths, and a releasing connection enabling the ram on retraction to feed a new pallet into the mold.

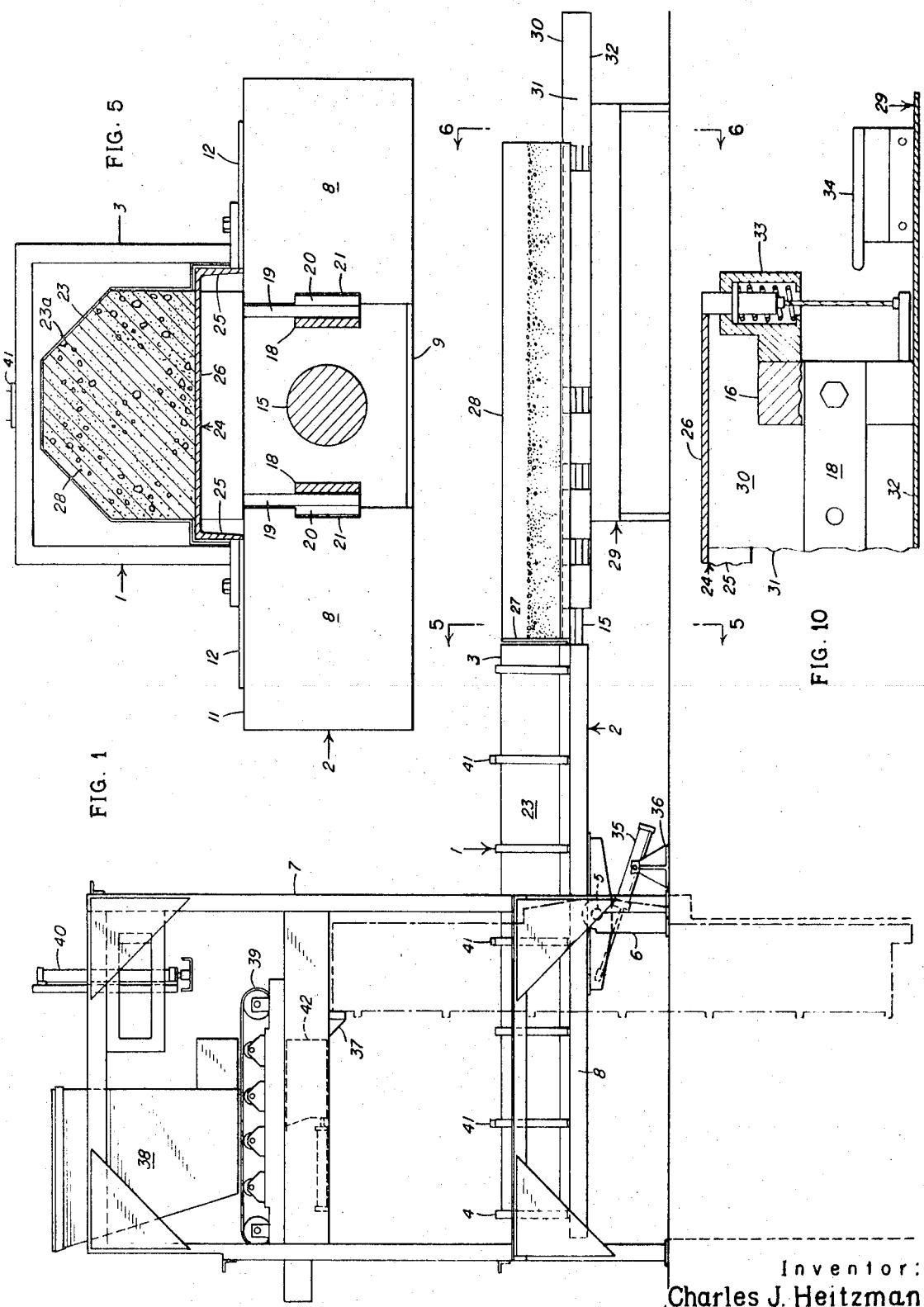

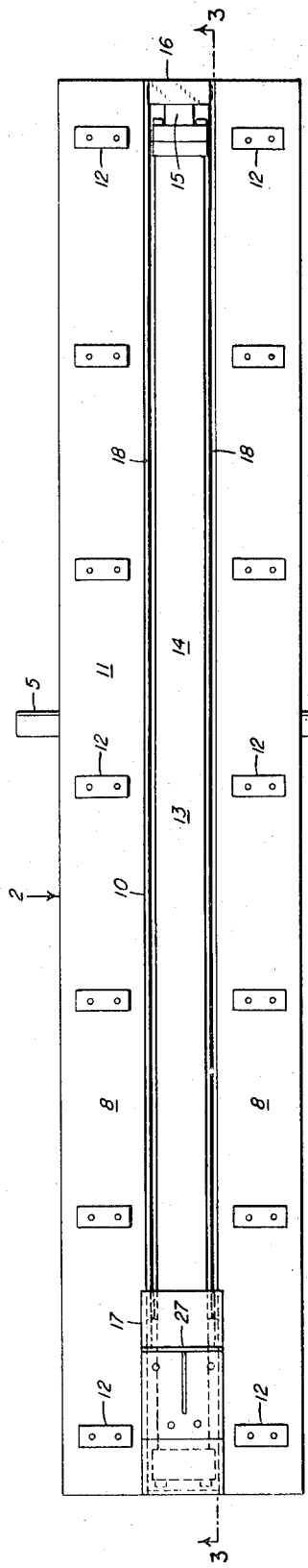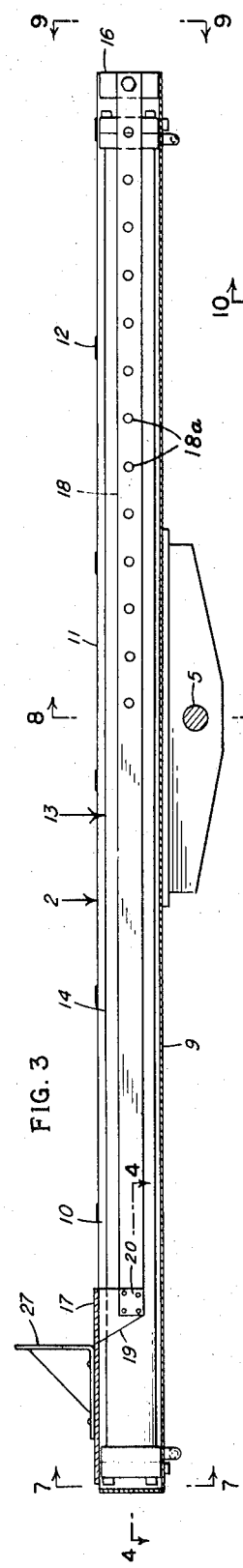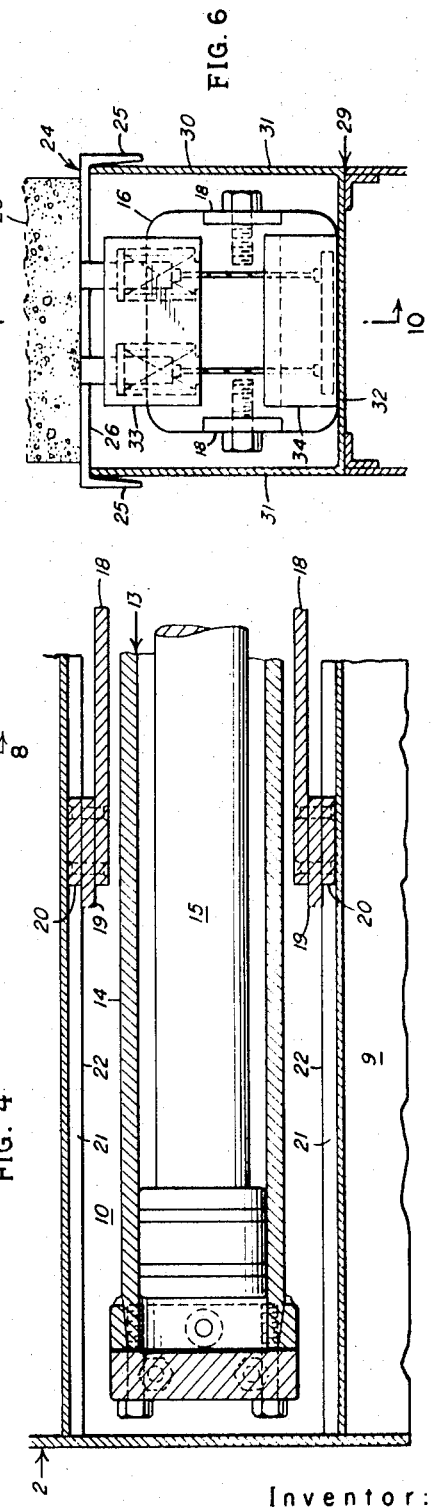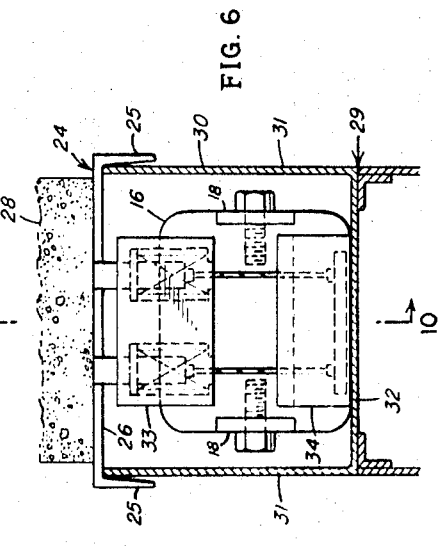

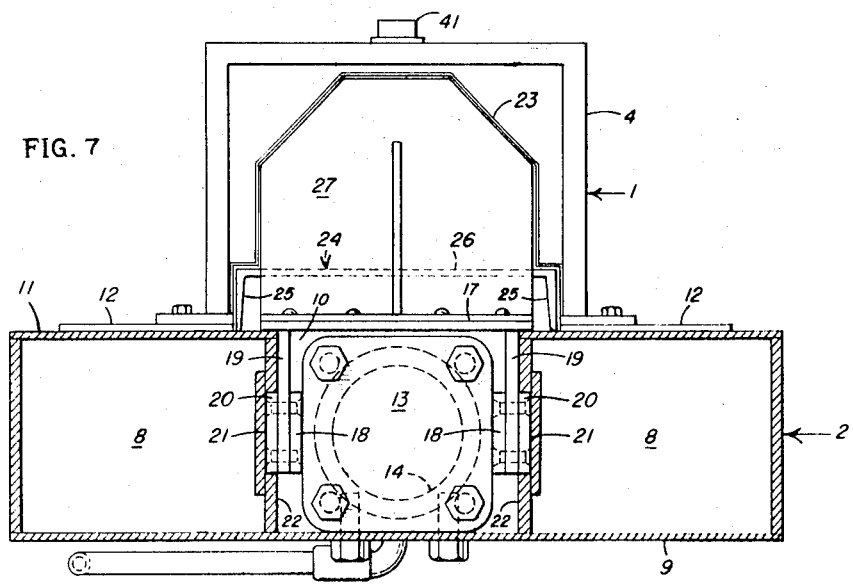
FIG. 7
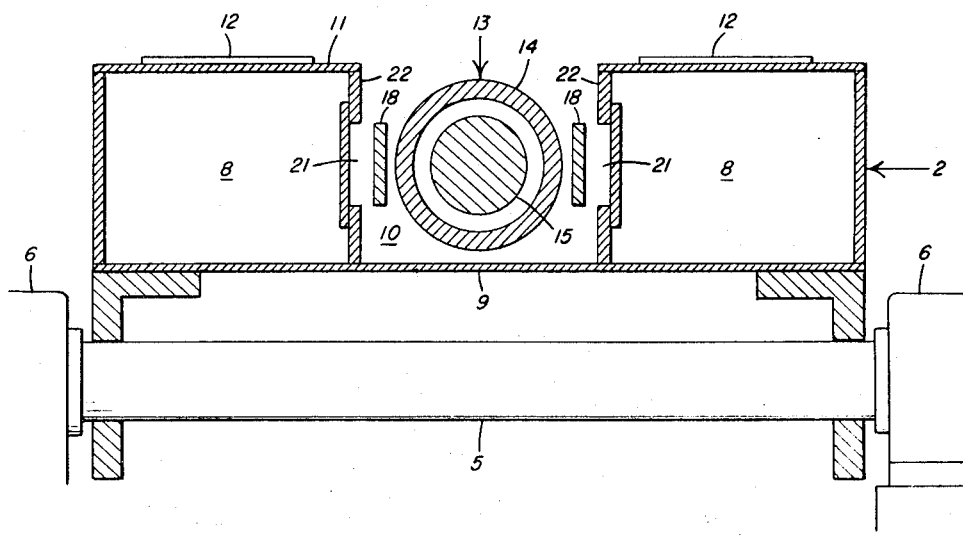
FIG. 8
FIG. 9
Inventor:
Charles J. Heitzman
By Wilmer Mecklin
his Attorney 3,624,825

CONCRETE MOLDING MACHINE

BACKGROUND OF THE INVENTION

Machines heretofore developed for molding articles of concrete and other self-hardening materials have generally been single purpose and incapable of high production rates. A notable exception in both respects is the molding machine disclosed in Heitzman U.S. Pat. No. 3,303,545, issued Feb. 14, 1967. The present invention is particularly concerned with an improvement on the machine of that patent.

SUMMARY OF THE INVENTION

An object of the present invention is to provide an improved machine for molding articles of self-hardening material which can produce a run of like articles at a high rate with minimum labor and is readily adaptable for producing in different runs articles of a wide range of sizes and shapes.

Another object of the invention is to provide an improved molding machine wherein a mold open at one end for filling and stripping therethrough, is mounted for swinging between vertical filling and horizontal stripping positions on a pivoted member also mounting a ram by which a finished article is stripped from the mold.

An additional object of the invention is to provide an improved molding machine wherein a mold box containing a mold formed by a liner and a pallet, a push plate for closing an end of the mold and a ram acting through the push plate for stripping a finished article on its pallet from the mold, are all mounted on a pivoted bed for swinging therewith between vertical filling and horizontal stripping positions and the parts, except for the bed and ram, are readily changeable for molding articles of different sizes and shapes.

A further object of the invention is to provide an improved molding machine of the character described in the preceding object, wherein a releasable connection between the ram and the pallet enables the ram on its retract stroke to feed a new pallet into the mold.

In its preferred embodiment, the improved molding machine of this invention has a frame mounting at an upper level a stationary charging hopper having a discharge conveyor, a vertically acting tamper and a horizontally reciprocable strike-off hopper for receiving material from the conveyor during a filling operation. At a lower level, the frame mounts a bed for pivoting about a fixed horizontal axis between vertical and horizontal positions under force of a fluid-actuated piston. In turn, the pivoted bed permanently mounts a fluid-actuated ram and a longitudinally movable carriage adjustably connected to the ram, and removably mounts a mold box releasably receiving a liner and pallet, which together laterally bound a mold open at one end and closed at the other by a push plate removably mounted on the carriage. The several parts mounted thereon pivot with the bed and in the latter's vertical position, the open end of the mold is presented for filling by the discharge conveyor through the strike-off hopper and for tamping by the tamper. The material fed into the mold preferably is consolidated therein not only by the tamper but also by one or more fluid-actuated vibrators mounted on the mold box, and, if the particular article is to be reinforced, will consolidate about whatever suitable reinforcement has been placed in the mold.

Hydraulic or other fluid actuation of the ram after return of the bed to horizontal stripping position drives the push plate through the liner in stripping a finished article and the pallet then supporting it from the mold. Retraction of the ram restores the push plate to initial position and a releasing connection carried by the ram enables it at the same time to feed a new pallet into the mold.

The foregoing and other objects and features of the invention will appear hereinafter in the detailed description, be particularly pointed out in the appended claims, and be illustrated in the accompanying drawings, in which:

FIG. 1 is a side elevational view of a preferred embodiment of the improved molding machine of the present invention showing the mold in horizontal stripping position and a finished article and its pallet stripped therefrom onto a runout table;

FIG. 2 is a plan view on an enlarged scale of the pivoted bed removed from the frame and with the mold box liner and pallet removed;

FIG. 3 is a vertical sectional view taken along lines 3—3 of FIG. 2; 5—

FIG. 4 is a fragmentary horizontal sectional view on a further enlarged scale taken along lines 4—4 of FIG. 3;

FIG. 5 is a vertical sectional view on the scale of FIG. 4, taken along lines 5—5 of FIG. 1;

FIG. 6 is a fragmentary vertical sectional view on the scale of FIG. 4 taken along lines 6—6 of FIG. 1 showing the ram in projected position with its head supported in the runout table;

FIG. 7 is a fragmentary vertical sectional view on the scale of FIG. 4 taken along lines 7—7 of FIG. 3, but with the mold box and liner in place;

FIG. 8 is a vertical sectional view on the scale of FIG. 4 taken along lines 8—8 of FIG. 3;

FIG. 9 is a fragmentary end elevational view on the scale of FIG. 4 taken along lines 9—9 of FIG. 3; and FIG. 10 is a fragmentary vertical sectional view taken along lines 10—10 of FIG. 6.

Detailed Description

Referring now in detail to the drawings in which like reference characters designate like parts, the improved molding machine of the present invention is designed to mold articles of concrete or other self-hardening material with or without internal reinforcement.

The improved molding machine is comprised of a mold box 1 which may have an upper portion unitary with a base, bed platform or bottom 2, but, for the widest range in sizes and shapes of molded articles produceable by the machine, preferably is itself a three-sided upper portion of inverted U-shape, bolted or otherwise releasably or separably mounted on the base. In either case the mold box 1 will be open at at least its front end 3 and preferably also at its rear end 4 and, with the base 2, be mounted for pivoting, swinging, or tilting about a fixed horizontal axis, suitably through an axle or shaft 5 fixed to and extending across the underside of the base substantially midway of the ends thereof and journaled at its own ends in laterally spaced uprights 6 of or on a frame 7. As preferred, the mold box 1 may be of solid or skeletal construction and the base 2 conveniently may be formed of a pair of laterally spaced, box-shaped side beams cross-connected at the rear and bottom, the latter by a common bottom plate 9.

For releasably or removably mounting the preferred separate mold box 1 on the base 2, the side beams 8, beyond opposite sides of the longitudinally extending central recess 10 therebetween, have fixed or secured to their upper sides or surfaces 11 a plurality of longitudinally spaced pairs of laterally aligned mounting pads 12, each suitably throughthreaded for bolting the mold box thereto. Upwardly opening and closed only at the rear, the central recess 10 seats or receives a fluid-actuated or otherwise suitably power-driven, preferably hydraulic stripping ram 13, whose cylinder 14 is fixed or secured to the bed 2, conveniently by bolting to the bottom plate 9, and extends substantially the full length of the recess. The ram 13 as a whole is mounted below the level of the upper surfaces 11 of the side beams 8 and contained within the lateral and normally vertical or transverse limits of the bed 2 and in retracted position the ram's piston 15 and its head 16, with the cylinder 14, preferably are contained within the longitudinal limits or extremities of the bed and substantially coextensive longitudinally with the mold box. The ram 13 ordinarily will not be removed from the bed 2 except when necessary for repair or replacement and this also is true of a carriage, slide or slide plate 17 straddling the central recess 10 and slidable longitudinally on or along the upper surfaces 11 of the slide beams 8 between the mounting pads 12.

Normally positioned adjacent or toward the rear end of the base 2 and thus at the opposite end thereof from the ram head 16 in the latter's retracted position, the carriage 17 is drivably connected to the head for reciprocable movement thereby longitudinally of the bed by a pair of push-pull or side straps 18 extending longitudinally along the central recess 10 at opposite sides of the cylinder 14. At the rear the straps 18 conveniently are connected to the carriage 17 through laterally spaced legs 19 fixed or secured to or rigid with and depending or downstanding from the carriage into the central recess at opposite sides of the piston 15. Connected on their insides to the straps, the legs 19 carry on their outsides as permanent attachments guides or guide blocks 20 received and sliding in guide slots 21 formed in and extending longitudinally of the confronting inner sides 22 of the beams at opposite sides of the central recess for holding the carriage on the base and guiding both the carriage and the rear ends of the straps in their longitudinal movement relative to the base. Contrary to their permanent connection at the rear to the carriage 17, the straps 18 at the front are preferably adjustably connected to the ram head 16 for adjusting the longitudinal spacing therebetween and the carriage, as by bolting each strap to the adjoining side of the head through any of a plurality or series of longitudinally and preferably evenly spaced holes 18a in and extending rearwardly from the front end of the strap.

For molding articles of different shapes, the mold box 1 itself is not a mold and, instead, contains at one time any of a plurality of suitably open-bottomed, interchangeable liners 23 of different internal configuration. Each liner 23 is open at the front and also preferably at the back and, on insertion into the mold box 1, usually through the front end thereof, is removably attached or secured thereto and remains therein during a run of the particular articles it is designed to mold. Also insertable into the mold box, but at the start of each casting operation for removal with an article molded in that operation, is one of a plurality of interchangeable pallets 24, each conveniently of inverted U-shape with depending side legs 25 slidably supported or resting on the upper surfaces 11 of the side beams 8 and an intervening web 26 closing the bottom of the liner 23.

Completing or closing the rear end of a mold 23a formed in balance by the liner 23 and pallet 24 and, like the liner, used throughout a run of articles, identical at least in cross section, is a push or stripping plate 27 bolted or otherwise releasably mounted on and upstanding from the carriage 17. Slidable longitudinally in but conforming in confronting peripheral contour to and closely fitting the interior of the liner 23, the push plate 27 usually will be positioned at the rear end of the liner but may be positioned forwardly thereof if an article shorter than the liner is being molded, with the positioning in either case obtained by suitable adjustment of the longitudinal spacing between the push plate or its carriage 17 and the ram head 16 through selective connection of the straps 18 to the head. While adapted to slide in the liner 23, the push plate 27 abuts against and acts as a rear stop for the rear end of the pallet 24, thus enabling it on an advance stroke or projection of the ram 13 to strip or eject the pallet and finished article thereon from the mold at the end of any molding operation in the run. Positioned below and substantially parallel to the mold 23a in the mold's horizontal stripping position, the ram 13, in stripping a pallet 24 and beam section or other finished article, exemplified at 28, from the mold actuates the push plate or pusher 27 to push the pallet onto any suitable runout device such as a conveyor, or, as illustrated a runout table 29. The illustrated table has a platform 30 conveniently of open-topped box construction with spaced upstanding sidewalls 31 slidably supporting the web 26 and straddles by the side legs 25 of the pallet 24 and a bottom wall 32 then aligned with the bottom plate 9 of the bed 2 and slidably supporting the piston head 16. A fork-lift truck, overhead crane, or other suitable means (not shown) may then be used for transporting the finished article on its pallet to a suitable storage area where the article can complete its hardening and be readied for shipment.

The illustrated ram 13 is adapted not only to push a finished article and its pallet from the mold 23a but also to draw or feed another or new pallet into the mold box 1 for the next molding operation. This capability is given it by mounting on its head 16 a spring-pressed or other suitable latch 33, which normally or at least in pulling position projects upwardly over or vertically overlaps the confronting outer end of the pallet to be inserted in the mold for the next molding operation and, if desired, is trippable downwardly out-of-the-way of the old or preceding pallet by a suitable tripper 34 on the runoff table 29.

In horizontal stripping position during stripping of a finished article and also during insertion of a new pallet 24 into the mold box 1, the bed 2, for filling the mold 23a is swingable, pivotable or tiltable between that position and a vertical filling position by suitable power means, such as the illustrated remotely controllable hydraulic or other fluid-actuated piston unit 35 pivotally mounted on a suitable stand 36 and connected to the bed longitudinally beyond the latter's pivot or pivotal axis. Tilting upwardly at the front in swinging to vertical filling position and fixed in that position, suitable by a stop 37 on the frame 7, the mold 23a in that position is closed at the rear or its then bottom by the push plate 27 and presents its open front end for filling with the concrete or other self-hardening material used in the particular run. For automating the filling, after insertion of reinforcing bars or other suitable reinforcement (not shown), as convenient in the mold's horizontal or vertical position, if the articles of the particular run are to be reinforced, there is mounted in the upper portion of the frame 7 a stationary charging hopper 38 and an underlying, suitably endless belt, feed, filling or hopper-discharging conveyor 39, onto which the hopper is adapted to discharge its contents by gravity. With the hopper 38 in the back and the mold box 1 in vertical filling position in the front of the frame 7, the feed conveyor 39 in the illustrated molding machine extends longitudinally of the frame from the hopper to a forward position in which its discharge end overlies the then presented open upper end of the mold 23a in the mold box for dumping the self-hardening material thereinto.

In addition to the charging hopper 38 and feed conveyor 39, the illustrated machine has mounted in the upper portion of the frame 7 a suitably fluid-actuated, vertically acting tamper 40 positioned in the front of the frame so as, when downwardly projected, to enter and, by tamping, consolidate the contents of the mold, usually after the latter has been filled. If desired, the consolidating action of the tamper can be supplemented or replaced by vibrating the mold box 1 at this stage by one or more suitably air-actuated tampers 41, conveniently mounted on the box. For uniformity in length and exposed end finish of the article in the mold in each molding operation, the frame 7 mounts for longitudinal reciprocation between the conveyor 39 and the upper end of the mold in the latter's vertical position, a fluid or otherwise suitably powered, open-ended strike-off hopper 42, which, during filling and tamping or other consolidation, is moved to a forward position against the upper end of the mold for passing thereto both the self-hardening material and the tamper 40, whereafter retraction of the strike-off hopper away from the mold will strike off the excess material from the presented end thereof.

In operating the improved molding machine, the bed 2, permanently mounted the ram 13 and carriage 17, will initially be in its horizontal position and the removable mold box or box upper portion 1, liner 23, push plate 27 and supply of pallets 24 suited for the particular article to be molded in the forthcoming run, will be selected from the stock of parts interchangeable with each. After mounting the upper portion of the mold box on the bed, inserting and locking or otherwise fixing the liner therein, mounting the selected push plate on its carriage and, as necessary, adjusting the longitudinal spacing between the push plate and the piston head 16 of the ram 13, the molding machine is readied for the first molding operation of the particular run by inserting a pallet into the mold box either by hand or, making use of the latch 33, by the ram. In the ensuring molding operation regardless of whether the articles of the particular run are to be reinforced or in what position any desired reinforcement is inserted in the mold 23a the mold box 1 for filling will be swung from its initial horizontal position to vertical filling position and there, with its open upper end presented and lower end closed by the push plate, filled and its filling consolidated by appropriately timed operations of the feed conveyor 39, tamper 40, vibrators 41 and strike-off hopper 42. At this stage, the mold box will be swung back to horizontal position and the ram actuated to push the finished article and its pallet from the mold box onto the runout table 29, following which the operation will be repeated as often as necessary to complete the particular run.

While the tiltable bed 2 has heretofore been referred to as a permanent part of the molding machine, it too can be selected either at the factory at which the molding machine is assembled or at a molding plant to suit the molding operations contemplated at the plant. In this case, the selection ordinarily will be on the basis of length and width and, depending on its length, the bed may or may not require pitting of the floor below the frame 7 to accommodate the swinging of the mold box between the horizontal and vertical positions.

From the above detailed description it will be apparent that there has been provided an improved molding machine for molding articles of self-hardening material, which is capable of a high rate of and wide variety in production and improves in several respects upon molding machines heretofore proposed. It should be understood that the described and disclosed embodiment is merely exemplary of the invention and that all modifications are intended to be included that do not depart from the spirit of the invention and the appended claims.

I claim:

1. A machine for molding articles of self-hardening material, comprising a platform mounted for swinging about a fixed horizontal axis between vertical filling and horizontal stripping positions, a mold box mounted on said platform, a mold in said mold box and having an open end presented in said vertical position for filling with said material, and means mounted on and swingable with said platform and operative in said horizontal position thereof for stripping a finished article from said mold, said stripping means including a power-driven ram, and said ram, in the retracted position thereof and the horizontal position of said mold being positioned below and substantially parallel to said mold and substantially coextensive longitudinally with said mold box.

2. A molding machine according to claim 1, wherein the mold includes an open-bottomed liner inserted in the mold box and fixed therein during a run of articles of uniform transverse peripheral contour, and a plurality of pallets sequentially inserted in the mold box, one for each molding operation, each of said pallets on insertion into the box closing a bottom of said liner during a single molding operation and being stripped from the box with and supporting a finished article at the end of said operation.

3. A molding machine according to claim 2, wherein the stripping means includes a push plate mounted on the mold box and drivably connected to the ram for reciprocation thereby longitudinally of the box, said push plate fitting in and in stripping moving forwardly through the liner and against the rear end of the pallet.

4. A molding machine according to claim 3, wherein the push plate during filling forms part and closes a rear end of the mold.

5. A molding machine according to claim 4, wherein the driving connection between the push plate and a head of the ram is adjustable for selectively adjusting the longitudinal spacing therebetween and therethrough the longitudinal position of the push plate relative to the liner during a molding operation prior to stripping.

6. A molding machine according to claim 5, wherein the stripping means includes a carriage mounting the push plate and drivably connected to the ram head.

7. A molding machine according to claim 6, wherein the mold box includes a permanent pivoted base and an upper portion removably attached thereto, and said base permanently mounts the ram and carriage.

8. A molding machine according to claim 2, including means mounted on the ram head and in a projected position thereof releasably engageable with an outer end of a pallet for drawing said pallet into the mold box at the beginning of a molding operation.

9. A molding machine according to claim 7, wherein the mold box upper portion, liner, supply of pallets and push plate are each selected from and interchangeable with any of a plurality of corresponding parts for enabling the molding machine to mold articles of a wide range of shapes each in a given run.

* * * * *